United States Patent
Ellis

(10) Patent No.: US 9,481,273 B2
(45) Date of Patent: Nov. 1, 2016

(54) CABLE RETENTION UNIT

(71) Applicant: ZODIAC SEATS US LLC, Gainesville, TX (US)

(72) Inventor: Clifton Ellis, Weatherford, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 14/062,917

(22) Filed: Oct. 25, 2013

(65) Prior Publication Data

US 2014/0117172 A1  May 1, 2014

Related U.S. Application Data

(60) Provisional application No. 61/720,231, filed on Oct. 30, 2012.

(51) Int. Cl.
*F16L 3/00* (2006.01)
*B60N 2/44* (2006.01)
*H02G 3/32* (2006.01)

(52) U.S. Cl.
CPC ................. *B60N 2/443* (2013.01); *H02G 3/32* (2013.01); *Y10T 29/49826* (2015.01)

(58) Field of Classification Search
CPC .. B60N 2/44; B60N 2002/126; B60N 2/231; B60N 2/23; B60T 7/105; F16C 1/10; A47C 1/024; A47C 1/022
USPC .............. 248/58, 65, 73; 24/457; 244/122 R, 244/122 B, 122 A, 122 AB, 122 AC, 122 AD, 244/122 AE, 122 AF, 122 AG, 122 AH; 174/97, 100, 135; 74/501.5 H, 501.5 R, 74/502.4; 297/378.14, 358, 85 C, 86
See application file for complete search history.

(56) References Cited

U.S. PATENT DOCUMENTS

| | | | | |
|---|---|---|---|---|
| 3,216,685 A * | 11/1965 | Raymond | ............... | F16B 2/245 248/316.7 |
| 3,262,662 A * | 7/1966 | Gastaldi | .................... | F16L 3/13 248/68.1 |
| 3,319,912 A * | 5/1967 | Crowther | .................. | F16C 1/10 248/74.1 |
| 3,730,019 A * | 5/1973 | Ballard | ..................... | F16C 1/18 244/122 R |
| 4,354,398 A * | 10/1982 | Porter | .................... | B60N 2/231 403/155 |
| 4,515,034 A * | 5/1985 | Porter | .................... | B60N 2/231 188/2 D |
| 5,029,822 A * | 7/1991 | Selzer | .................... | B64D 11/06 267/131 |
| 5,762,299 A * | 6/1998 | Motsch | ..................... | F16L 3/13 248/65 |
| 6,279,416 B1 * | 8/2001 | Bucholtz | ................... | F16C 1/12 74/501.5 H |

\* cited by examiner

*Primary Examiner* — Jonathan Liu
*Assistant Examiner* — Muhammad Ijaz
(74) *Attorney, Agent, or Firm* — Kilpatrick Townsend & Stockton LLP; Dean W. Russell; Davidson G. Lucas

(57) ABSTRACT

Embodiments of the present invention relate generally to a device for maintaining a cable in place or otherwise securing, capping, shielding, or guarding a cable. In one embodiment, the cable retention unit is used to secure or guard a cable in place in a seat actuator or other cable-containing component.

10 Claims, 5 Drawing Sheets

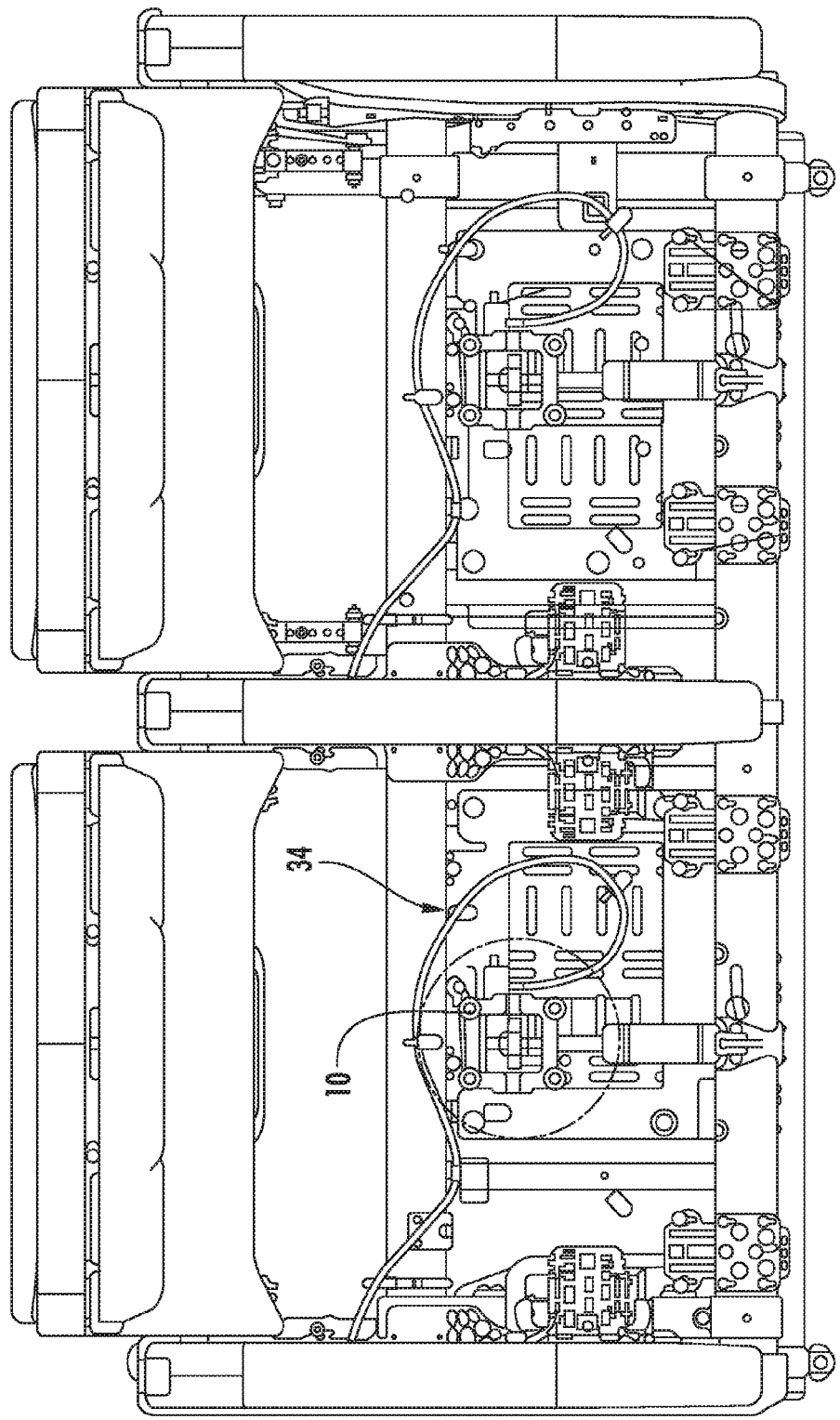

CABLE RETENTION UNIT

CROSS REFERENCE TO RELATED APPLICATIONS

This application claims the benefit of U.S. Provisional Application Ser. No. 61/720,231, filed Oct. 30, 2012, titled "Cable Retention Unit," the entire contents of which are hereby incorporated by reference.

FIELD OF THE INVENTION

Embodiments of the present invention relate generally to a device for maintaining a cable in place or otherwise securing, capping, shielding, or guarding a cable. In one embodiment, the cable retention unit is used to secure or guard a cable in place in a seat actuator or other cable-containing component.

BACKGROUND

Aircraft seats are designed to have various reclining positions. These reclining positions are generally provided by a recline cable that activates the seat's recline hydraulic actuator. The cable is a part of a cable system that includes a push button, a cable, a spring, and an actuator head. When the passenger presses the push button, the cable is pulled, which lowers the actuator head. Lowering of the actuator head presses the release on the hydraulic actuator. After the push button is pressed, the spring installed under the actuator head returns the actuator head to its original position. Upon pressing the release on the hydraulic actuator, the passenger is able to recline his/her seat, or return it to the upright position. An example of such an actuator head is shown in FIG. 2, and its position in a seat is shown in FIG. 18.

The ability to recline a passenger seat greatly enhances passenger comfort, particularly on longer flights or in economy seats, where space is limited. However, it is also important that the seat can reliably move to its upright position for taxi, take-off, and landing in order to comply with aviation safety regulations.

One problem with existing seat designs is that when the button is pressed and the actuator head is moved, the cable can possibly be dislodged from the actuator head. If the cable becomes dislodged, the push button will be rendered incapable of activating the actuator head. In this instance, the passenger can no longer recline the seat, nor return the seat to the original upright position. This can create a safety concern as well as a regulation hazard if the seat becomes stuck in the reclined position. This can also result in maintenance delays for the aircraft, which can increase airline expenses.

Other components that secure or hold cables in place may experience similar slippage or dislodging. For example, a fiber optic cable may need to be secured in place. Other cables may be secured in an open-ended receiving component and held in place or otherwise secured only by friction.

There may be other instances when it is desirable to guard a cable or otherwise provide a cap to protect or shield a cable from environmental conditions or hazards, such as corrosion, temperatures, or other factors. There may be other instances when it is desirable to provide a shield for a cable to protect others in the vicinity of the cable. Such cables would benefit from the cable retention unit described herein.

BRIEF SUMMARY

Embodiments of the invention described herein thus provide a solution to prevent a cable from dislodging from a cable-holding unit. In a specific embodiment, there is provided a solution to prevent a recline cable from dislodging from an actuator head. Embodiments may also provide a guard, shield, or cable protector. The devices described herein may also be used in connection with a seat component cable or any other component cable. The devices may be used to retrofit a current seat in order to secure a cable in place, or they may be used on newly-manufactured seats in the original manufacturing process. In a particular embodiment, it has been found that by attaching the described cable retention device to a recline cable assembly of an aircraft seat, the recline cable is prevented from dislodging from the actuator head.

BRIEF DESCRIPTION OF THE DRAWINGS

FIG. 18 shows a perspective schematic view showing a cable retention unit in place on an aircraft passenger seat.

DETAILED DESCRIPTION

Figure 1:
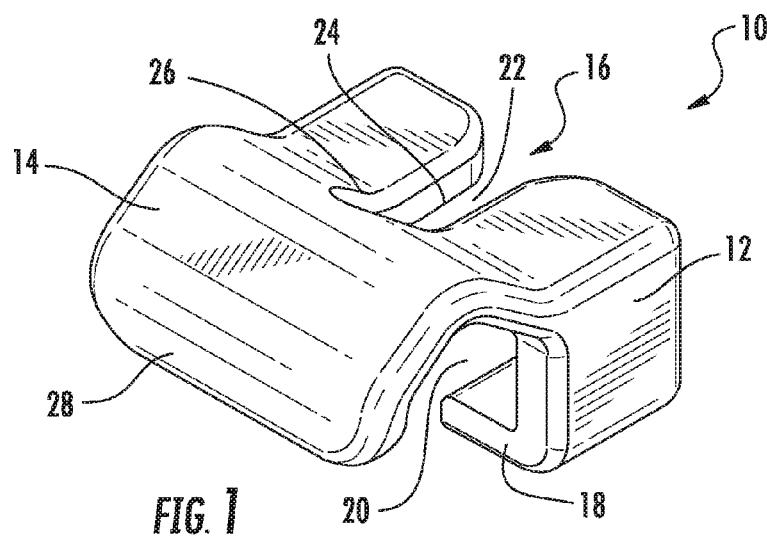
FIG. 1 shows a perspective view of one embodiment of a cable retention unit.

Embodiments of the present invention provide a cable retention unit 10. The unit 10 has an attachment component 12 and a portion 14 extending from the attachment component. As shown in FIG. 1, the attachment component 12 may have an attachment opening 16 that is bound by side flanges 18. This configuration allows the unit 10 to expand to fit over an end of the area to be guarded or protected. Although side flanges 18 are shown with a lower opening 20 therebetween, it is possible for the attachment component 12 to have a solid base.

Extending into the body of the attachment component 12 is a small channel 22 for receiving a cable portion. The channel 22 in the back side of the unit 10 allows the installer to clear the recline cable. This channel 22 may be shaped and configured so that it allows a cable portion to slide therein. In the embodiment shown, the channel 22 has side walls 24 and terminates at a channel stop 26. Channel 22 is shown as having a generally straight outline with a U-shaped border, but it may curved, J-shaped, C-shaped, or any other configuration. Curved channels may provide various locking configurations to be possible, if desired.

Figure 2:
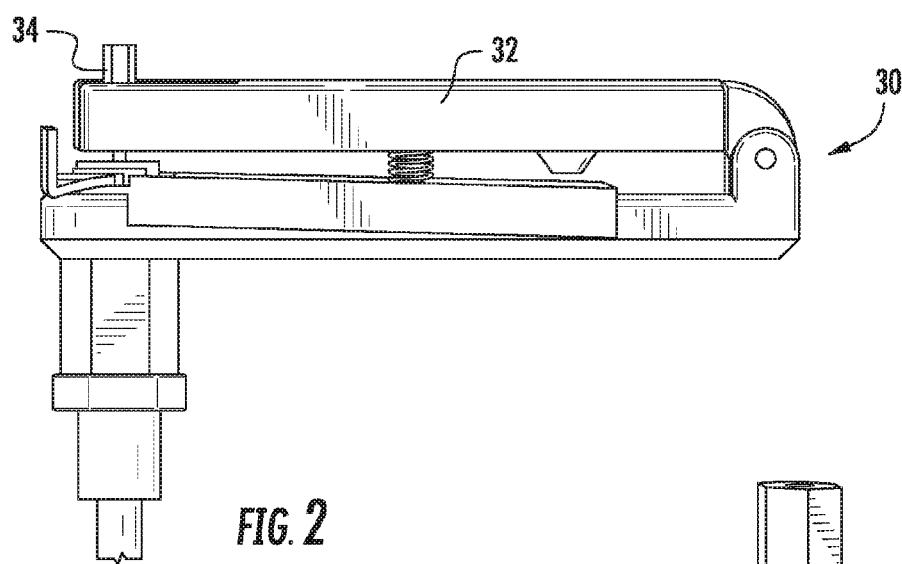
FIG. 2 shows a side plan view of a recline cable assembly without a cable retention unit in place.
Figure 3:
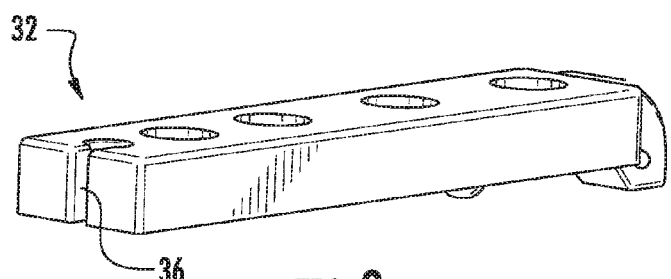
FIG. 3 shows a side perspective view of an actuator head of the recline cable assembly.
Figure 4:
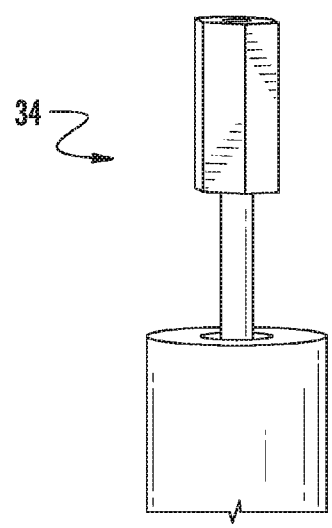
FIG. 4 shows a side view of a recline cable of the recline cable assembly.

Extending from the attachment component 12 is a portion 14. This portion 14 generally begins at the channel stop 26 and provides a downward hood 28. In a specific embodiment, the downward hood 28 limits a recline cable from dislodging from the actuator head. For example, FIG. 2 shows an exemplary recline cable assembly 30 for an aircraft seat. The primary components for purposes of this discussion are the actuator head 32 and the recline cable 34. The actuator head 32 is shown in FIG. 3, and the recline cable 34 is shown in FIG. 4. The actuator head 32 has an opening 36 into which the recline cable 34 fits. Providing the opening 36 in the actuator head 32 is believed to ease manufacturing of the actuator head 32, because otherwise, the cable would need to be formed and positioned during manufacturing. With the current configuration, the recline cable 34 is positioned into the opening 36 after the two components have been machined. As shown in FIG. 2, the recline cable 34 is wedged into opening 36.

Figure 5:
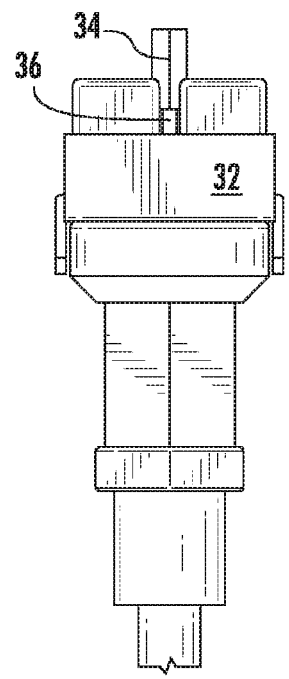
FIG. 5 shows a front plan view of the recline cable assembly of FIG. 2.
Figure 6:
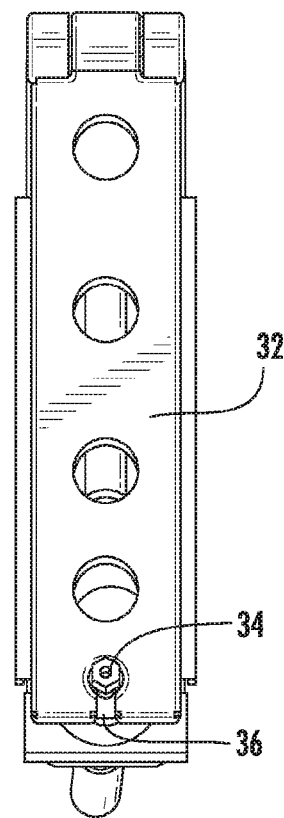
FIG. 6 shows a top plan view of the recline cable assembly of FIG. 2.

However, this wedging is not always secure enough to reliably and consistently ensure that the recline cable 34 does not dislodge from opening 36. FIGS. 5 and 6 show front and top views of the assembly 30 without the unit 10 in place. These figures illustrate how the cable 34 could potentially dislodge from the actuator head 32 from opening 36.

Figure 7:
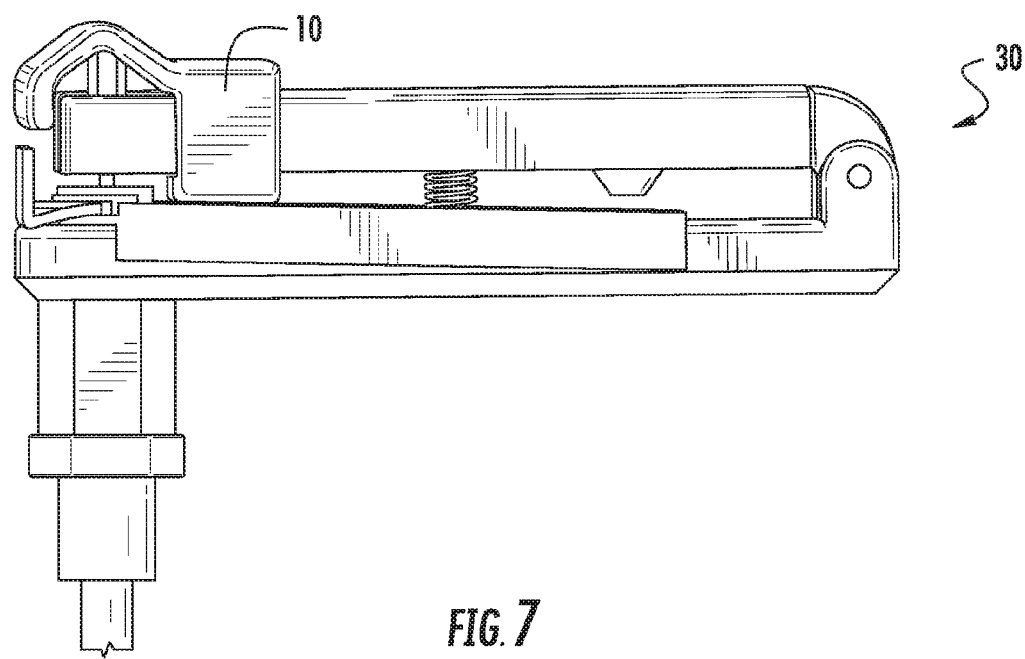
FIG. 7 shows a side plan view of a recline cable assembly with a cable retention unit in place.

Accordingly, FIG. 7 shows a cable retention unit 10 in place on the recline cable assembly 30. Specifically, the attachment component 12 is positioned over the end of the assembly 30 so that the attachment opening 16 receives the end of the actuator head 32. The channel 22 receives the recline cable 34. In use, the recline cable 34 is guided and retained by the side walls 24 and abuts the channel stop 26. The downward hood 28 then wraps around the recline cable 34. This configuration can help protect or guard the cable. This configuration also helps prevent the recline cable 34 from dislodging from the opening 36, as the downward hood covers opening 36. The fit of the attachment component 12 of the unit 10 as it is positioned over the assembly 30 is desirably secure enough that the unit does not slip or budge from its position once placed.

Figure 8:
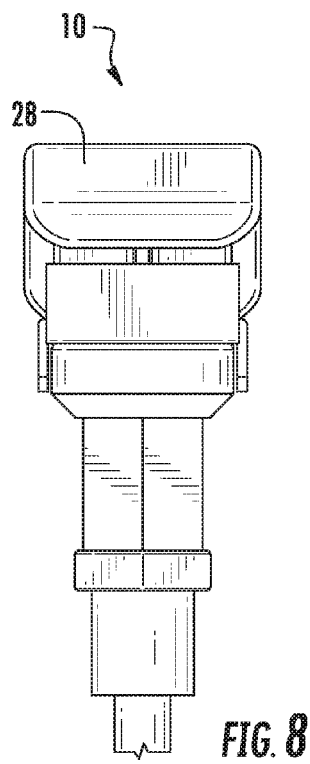
FIG. 8 shows a front plan view of the recline cable assembly of FIG. 7.
Figure 9:
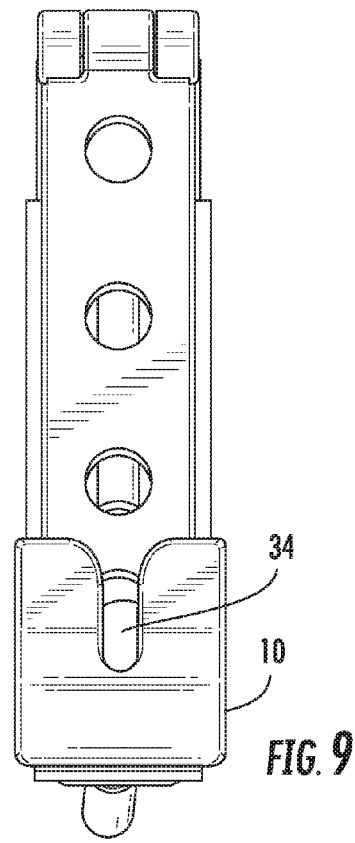
FIG. 9 shows a top plan view of the recline cable assembly of FIG. 7.

FIGS. 8 and 9 show front and top views of the assembly 30 with the unit 10 positioned. The downward hood 28 wraps over the cable 34 and secures the opening 36 of the actuator head 32. This prevent slippage of cable 34.

Figure 10A:
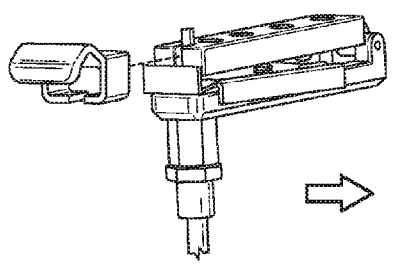
FIGS. 10A-10C show a front view of a cable retention unit being positioned on an actuator head of a recline cable assembly.
Figure 10B:
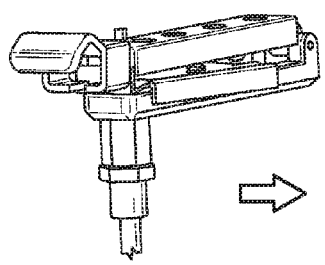
Figure 10C:
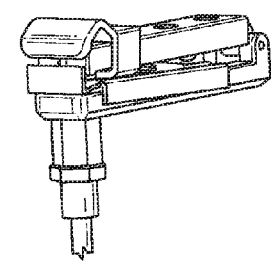
Figure 11A:
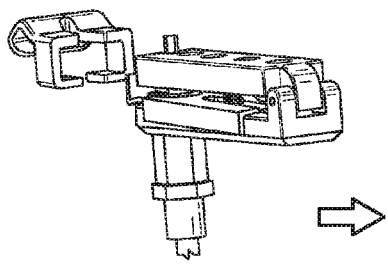
FIGS. 11A-11C show a rear view of a cable retention unit being positioned on an actuator head of a recline cable assembly.
Figure 11B:
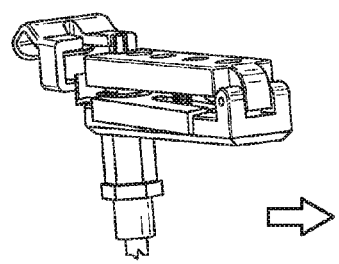
Figure 11C:
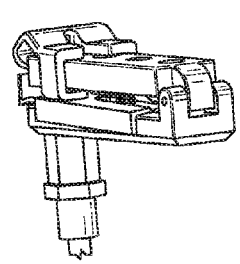
Figure 12:
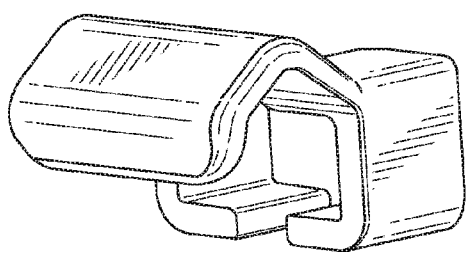
FIG. 12 shows a front perspective view of one embodiment of a cable retention unit.
Figure 13:
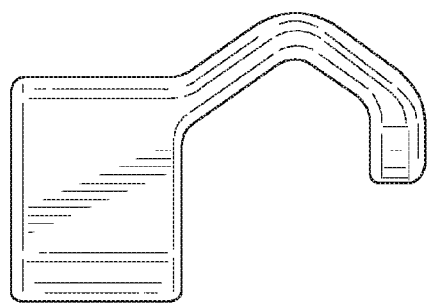
FIG. 13 shows a side plan perspective view of one embodiment of a cable retention unit.
Figure 14:
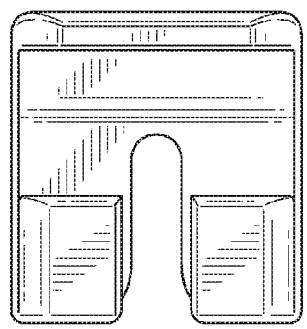
FIG. 14 shows a bottom plan perspective view of one embodiment of a cable retention unit.
Figure 15:
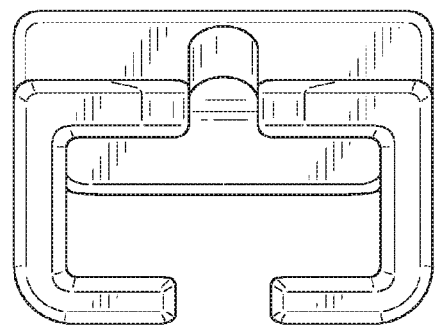
FIG. 15 shows a rear plan perspective view of one embodiment of a cable retention unit.
Figure 16:
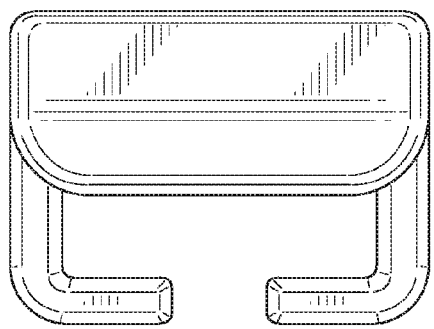
FIG. 16 shows a front plan view of one embodiment of a cable retention unit.
Figure 17:
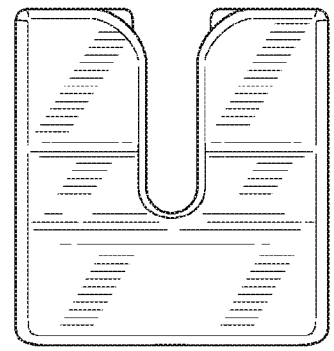
FIG. 17 shows a top plan view of one embodiment of a cable retention unit.

FIGS. 10A-10C show the steps of positioning the unit 10 onto the assembly 30 and illustrate the lack of tools needed. The user simply slides the unit onto the end of the assembly 30. The recline cable 34 is caused to be secured in channel 22. If provided, the side flanges 18 slightly extend out such that they can receive the actuator head 32 and provide an internal pressure to maintain the unit 10 in place. FIGS. 11A-11C show a rear view of the unit 10 being positioned. FIGS. 12-17 show varying views of the cable retention unit 10.

In one embodiment, the unit 10 is made from a rigid plastic. The material may be selected such that it has a small amount of flexibility in order position the unit 10, but is rigid enough that maintains the unit 10 securely in place. It is desirable that the unit 10 maintain its position even upon a pulling action of the recline cable. In other embodiments, the unit 10 may comprise metal, silicone rubber, any commercial plastic, any injection moldable plastic, polyethylene or UHMWPE, or any other material. The unit may be formed as an integral, one-piece unit. Alternatively, the unit may be provided as multiple components that are welded or otherwise secured together. The manufacturing process is dependent only upon manufacturing consideration and restrictions. The unit may be self-retained and installable without any tools. The cable retention unit 10 is designed such that installation requires no hardware or adhesives to install or retain. The unit may be snap-fit onto the assembly. The unit generally has no detrimental effects to the adjustability of the recline cable assembly. If adjustment is needed, the cable can be adjusted with the unit in place. In an alternate embodiment, the unit 10 may be removed, the cable adjusted, and the unit replaced. In the specific embodiment shown, the unit prevents the recline cable 34 from dislodging from the actuator head 32.

In other embodiments, the cable retention unit may be used to snap onto any opening from which a cable or other cord or rope may slip. For example, the embodiment disclosed may find use in the fiber optic cable industry, in the marine industry, in the home craft industry, or in any other instance when a cable cap is needed.

Changes and modifications, additions and deletions may be made to the structures and methods recited above and shown in the drawings without departing from the scope or spirit of the invention and the following claims.

What is claimed is:

1. A cable retention unit assembly, comprising:
    (a) an actuator head comprising an end with an opening;
    (b) a cable that extends through the opening of the actuator head end and a cable end that extends above the opening;
    (c) a cable retention unit comprising an upper portion, two side flanges disposed on opposite sides of the cable retention unit from one another, and two bottom portions such that each bottom portion is attached to the respective side flange wherein the cable retention unit is positioned to at least partially surround the actuator head such that the upper portion of the cable retention unit is disposed adjacent to a top portion of the actuator head when the cable retention unit is in an installed position, each of the two side flanges is disposed adjacent to a side face of the actuator head when the cable retention unit is in the installed position, and the two bottom portions are disposed adjacent to a bottom face of the actuator head when the cable retention unit is in the installed position;
    (d) a channel extending from a first edge of the upper portion of the cable retention unit to a channel stop;
    (e) a portion extending from the end of the upper portion of the cable retention unit adjacent the channel stop, wherein the portion comprises a downward hood that is configured to at least partially cover the cable end when the cable retention unit is in the installed position when viewed from above the downward hood along an axis that is approximately parallel to the cable;
    (f) wherein the channel is shaped to allow the cable end to extend through the upper portion until the cable retention unit is in the installed position and the downward hood is at least partially covering the cable end, wherein the cable is longitudinally held in place between the downward hood and the actuator head end; and (g) when the cable retention unit is in the installed position, the cable retention unit is constrained with respect to the actuator head on four sides such that the cable retention unit can only slide along a length of the actuator head.

2. The assembly of claim 1, wherein the downward hood includes an area that is perpendicular to an axial direction of the cable.

3. The assembly of claim 1, wherein the cable retention unit is configured to snap fit onto the actuator head.

4. The assembly of claim 1, wherein the cable retention unit is configured to snap fit onto an actuator head of an aircraft seat.

5. The assembly of claim 1, wherein the cable retention unit comprises rigid plastic, metal, silicone rubber, moldable plastic, polyethylene, or any combination thereof.

6. The assembly of claim 1, wherein the opening of the actuator head comprises a slot and a cylindrical cavity such that the cable is inserted into the slot and is positioned in the cylindrical cavity.

7. The assembly of claim 1, wherein: the portion extending from the end of the upper portion of the cable retention unit is disposed such that the cable end is located between the actuator head and the portion extending from the end of the upper portion of the cable retention unit.

8. A cable retention unit assembly, comprising:
(a) an actuator head comprising an end with an opening;
(b) a cable that extends through the opening of the actuator head end and a cable end that extends above the opening;
(c) a cable retention unit comprising an upper portion disposed adjacent to a top portion of the actuator head, side flanges that are each disposed adjacent to a respective side face of the actuator head, and at least one bottom portion to form a substantially rectangular passage, wherein the cable retention unit is positioned in an installed position to at least partially surround the actuator head such that the at least one bottom portion is disposed adjacent to a bottom face of the actuator head;
(d) a channel extending from a first edge of the upper portion of the cable retention unit to a channel stop;
(e) a portion extending from the end of the upper portion of the cable retention unit adjacent the channel stop, wherein the portion comprises a downward hood that is configured to at least partially cover the cable end when the cable retention unit is in the installed position when viewed from above the downward hood along an axis that is approximately parallel to the cable;
(f) wherein the channel is shaped to allow the cable end to extend through the upper portion until the cable retention unit is in the installed position and the downward hood is at least partially covering the cable end, wherein the cable is longitudinally held in place between the downward hood and the actuator head end; and
(g) the cable retention unit is constrained with respect to the actuator head on four sides such that the cable retention unit can only slide along a length of the actuator head.

9. The assembly of claim 8, wherein the opening of the actuator head comprises a slot and a cylindrical cavity such that the cable is inserted into the slot and is positioned in the cylindrical cavity.

10. The assembly of claim 8, wherein: the portion extending from the end of the upper portion of the cable retention unit is disposed such that the cable end is located between the actuator head and the portion extending from the end of the upper portion of the cable retention unit.

* * * * *